E. T. Harlan.
Churn.

N° 76,185. Patented Mar. 31, 1868.

Witnesses.
Chas. F. Clausen
Jos. R. Edson

Inventor.
E. T. Harlan
by
O. P. Holloway & Co.
his Attys

United States Patent Office.

ENEAS T. HARLAN, OF STAR CITY, INDIANA.

Letters Patent No. 76,185, dated March 31, 1868.

IMPROVEMENT IN CHURNS.

*The Schedule referred to in these Letters Patent and making part of the same.*

TO ALL WHOM IT MAY CONCERN:

Be it known that I, ENEAS T. HARLAN, of Star City, in the county of Pulaski, and State of Indiana, have invented a new and useful Improvement in Churns; and I do hereby declare that the following is a full, clear, and exact description of the same, reference being had to the annexed drawings, making part of this specification, in which—

Figure 1:
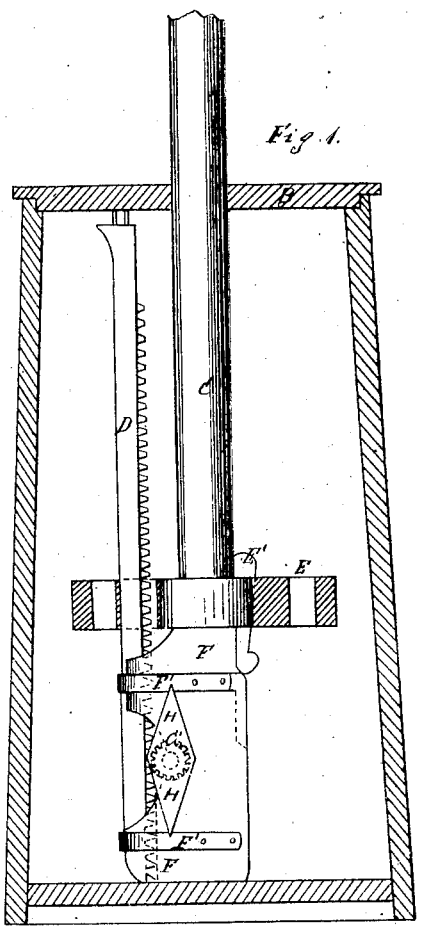
Figure 1 is a vertical section.
Figure 3:
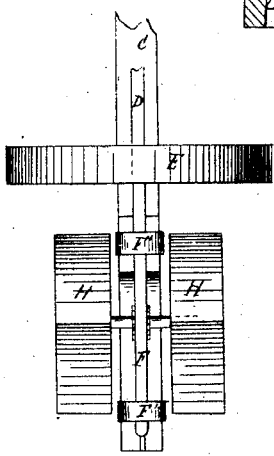
Figure 2:
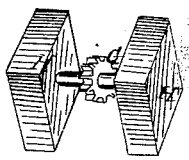
Figure 2 is an elevation of the dasher.

Figure 3 a perspective view of the revolving paddles.

The same letters in all the figures indicate the same parts.

The body of the churn is shown at A; it is covered by the lid B, through a hole in the centre of which passes the dasher-handle C. A rack-bar, D, is hinged to the lower side of the lid B. At the bottom of the round part of the dasher-handle C is attached the dasher E by means of a key, E'. This dasher is a perforated disk, of ordinary form. The lower end of the dasher is formed as shown at F. The lugs thereon are grooved to receive the rack-bar D, which is confined by the straps F'. A shaft, on the middle of which is a pinion, G, has its bearings against the part F between the lugs, as shown. This pinion meshes into the rack on the bar D. The shaft of the pinion extends beyond the part F, on both sides thereof, and to the ends are attached the paddles H.

As the handle C is drawn up and down, the disk E acts upon the cream in the ordinary manner. The pinion G, in passing along the cogs of the rack-bar, receives and communicates to the paddles H a rapid revolution in opposite directions, as the handle is moved up and down, thereby further agitating the cream, and breaking its globules, hastening the formation of butter.

What I claim as my invention, and desire to secure by Letters Patent, is—

1. The combination of the perforated disk E and the paddles H revolving in opposite directions with the movement of the dasher, substantially as set forth.

2. The combination of the handle, the rack-bar, the dasher, the pinion, and the paddles, arranged to operate substantially in the manner set forth.

In testimony whereof, I have signed my name to this specification in the presence of two subscribing witnesses.

E. T. HARLAN.

Witnesses:
ANDREW WIRICK,
W. H. BROWN.